US012431631B2

(12) United States Patent
Lee et al.

(10) Patent No.: US 12,431,631 B2
(45) Date of Patent: Sep. 30, 2025

(54) WEARABLE DEVICE

(71) Applicant: Quanta Computer Inc., Taoyuan (TW)

(72) Inventors: Kuan-Hsien Lee, Taoyuan (TW); Chung-Ting Hung, Taoyuan (TW); Chin-Lung Tsai, Taoyuan (TW); Yu-Chen Zhao, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 87 days.

(21) Appl. No.: 18/432,438

(22) Filed: Feb. 5, 2024

(65) Prior Publication Data

US 2025/0226586 A1 Jul. 10, 2025

(30) Foreign Application Priority Data

Jan. 4, 2024 (TW) ................................ 113200118

(51) Int. Cl.
*H01Q 1/27* (2006.01)
*H01Q 5/342* (2015.01)
*H01Q 13/16* (2006.01)

(52) U.S. Cl.
CPC ............. *H01Q 13/16* (2013.01); *H01Q 5/342* (2015.01); *H01Q 1/273* (2013.01)

(58) Field of Classification Search
CPC ......... H01Q 13/16; H01Q 5/342; H01Q 1/273
See application file for complete search history.

(56) References Cited

U.S. PATENT DOCUMENTS

| | | | | |
|---|---|---|---|---|
| 2019/0198975 | A1* | 6/2019 | Chen | H01Q 9/42 |
| 2024/0195082 | A1* | 6/2024 | Lo | H01Q 5/378 |
| 2024/0347910 | A1* | 10/2024 | Chang | H01Q 5/35 |
| 2024/0372261 | A1* | 11/2024 | Yun | G02B 27/017 |
| 2025/0125520 | A1* | 4/2025 | Tseng | H01Q 9/0407 |
| 2025/0174877 | A1* | 5/2025 | Tai | H01Q 1/48 |
| 2025/0174900 | A1* | 5/2025 | Zhao | H01Q 1/38 |

* cited by examiner

*Primary Examiner* — Awat M Salih
(74) *Attorney, Agent, or Firm* — McClure, Qualey & Rodack, LLP

(57) ABSTRACT

A wearable device includes a feeding radiation element, a ground element, a connection radiation element, an additional radiation element, a first grounding radiation element, a second grounding radiation element, and a carrier element. The feeding radiation element has a positive feeding point. The ground element has a negative feeding point. The additional radiation element is coupled through the connection radiation element to the feeding radiation element. The first grounding radiation element is coupled to the ground element. The first grounding radiation element is adjacent to the feeding radiation element. The second grounding radiation element is coupled to the ground element. The second grounding radiation element is adjacent to the feeding radiation element. An antenna structure is formed by the feeding radiation element, the ground element, the connection radiation element, the additional radiation element, the first grounding radiation element, and the second grounding radiation element.

10 Claims, 3 Drawing Sheets

WEARABLE DEVICE

CROSS REFERENCE TO RELATED APPLICATIONS

This application claims priority of Taiwan Patent Application No. 113200118 filed on Jan. 4, 2024, the entirety of which is incorporated by reference herein.

BACKGROUND OF THE INVENTION

Field of the Invention

The disclosure relates in general to a wearable device, and in particular, to a wearable device with an antenna structure therein.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Researchers predict that the next generation of mobile devices will be "wearable devices". For example, wireless communication may be applied to watches, glasses, and even clothes in the future. However, glasses, for example, do not have a large enough space to accommodate antennas for wireless communication. Therefore, this has become a critical challenge for antenna designers.

BRIEF SUMMARY OF THE INVENTION

In an exemplary embodiment, the invention is directed to a wearable device that includes a feeding radiation element, a ground element, a connection radiation element, an additional radiation element, a first grounding radiation element, a second grounding radiation element, and a carrier element. The feeding radiation element has a positive feeding point. The ground element has a negative feeding point. The additional radiation element is coupled through the connection radiation element to the feeding radiation element. The first grounding radiation element is coupled to the ground element. The first grounding radiation element is adjacent to the feeding radiation element. The second grounding radiation element is coupled to the ground element. The second grounding radiation element is adjacent to the feeding radiation element. The feeding radiation element, the ground element, the connection radiation element, the additional radiation element, the first grounding radiation element, and the second grounding radiation element are all disposed on the carrier element. An antenna structure is formed by the feeding radiation element, the ground element, the connection radiation element, the additional radiation element, the first grounding radiation element, and the second grounding radiation element.

In some embodiments, the wearable device is a pair of smart eyeglasses with the function of wireless communication, and includes a nonconductive frame element. The carrier element is disposed on the nonconductive frame element.

In some embodiments, the feeding radiation element is disposed between the first grounding radiation element and the second grounding radiation element.

In some embodiments, the ground element also has a notch region.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the feeding radiation element, the connection radiation element, and the additional radiation element is substantially equal to 0.25 wavelength of the first frequency band.

In some embodiments, the length of the first grounding radiation element is substantially equal to 0.25 wavelength of the second frequency band.

In some embodiments, the length of the second grounding radiation element is substantially equal to 0.25 wavelength of the third frequency band.

In some embodiments, the first coupling gap is formed between the first grounding radiation element and the feeding radiation element. A second coupling gap is formed between the second grounding radiation element and the feeding radiation element. A third coupling gap is formed between the second grounding radiation element and the additional radiation element.

In some embodiments, the carrier element is an FPC (Flexible Printed Circuit).

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
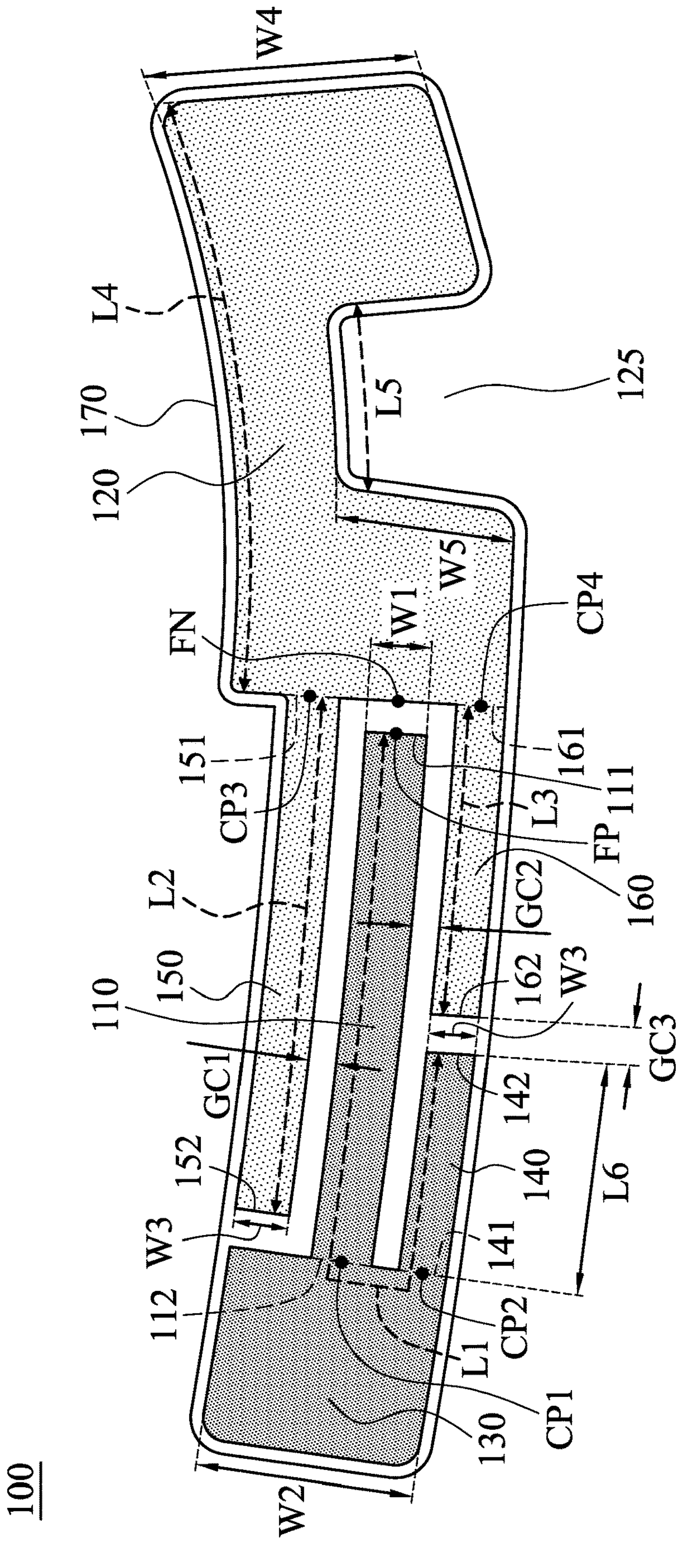
FIG. 1 is a flat expansion view of a wearable device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a flat expansion view of a wearable device 100 according to an embodiment of the invention. For example, the wearable device 100 may be a pair of smart eyeglasses with the function of wireless communication, but it is not limited thereto.

In the embodiment of FIG. 1, the wearable device 100 at least includes a feeding radiation element 110, a ground element 120, a connection radiation element 130, an additional radiation element 140, a first grounding radiation element 150, a second grounding radiation element 160, and a carrier element 170. The feeding radiation element 110, the ground element 120, the connection radiation element 130, the additional radiation element 140, the first grounding radiation element 150, and the second grounding radiation element 160 may all be made of metal materials, such as copper, silver, aluminum, iron, or their alloys. It should be understood that the wearable device 100 may further include other components, such as a processor, a speaker, a camera element, and/or a battery element, although they are not displayed in FIG. 1.

For example, the feeding radiation element 110 may substantially have a straight-line shape. Specifically, the feeding radiation element 110 has a first end 111 and a second end 112. A positive feeding point FP is positioned at the first end 111 of the feeding radiation element 110. In some embodiments, the feeding radiation element 110 is disposed between the first grounding radiation element 150 and the second grounding radiation element 160. The feeding radiation element 110, the first grounding radiation element 150, and the second grounding radiation element 160 may be substantially parallel to each other.

For example, the ground element 120 may substantially have a relatively large rectangular shape. A negative feeding point FN may be positioned at one edge of the ground element 120. The negative feeding point FN may correspond to the aforementioned positive feeding point FP. In some embodiments, the ground element 120 also has a notch region 125, which may substantially have a relatively small rectangular shape.

In some embodiments, the wearable device 100 further includes a signal source (not shown). Specifically, the signal source may be an RF (Radio Frequency) module. A positive electrode of the signal source may be coupled to the positive feeding point FP, and a negative electrode of the signal source may be coupled to the negative feeding point FN. In alternative embodiments, the wearable device 100 further includes a coaxial cable (not shown) coupled to the aforementioned signal source. A central conductor of the coaxial cable may be coupled to the positive feeding point FP, and a conductive housing of the coaxial cable may be coupled to the negative feeding point FN.

For example, the connection radiation element 130 may substantially have a square shape, and the additional radiation element 140 may substantially have another straight-line shape. The additional radiation element 140 may be substantially parallel to the feeding radiation element 110. The second end 112 of the feeding radiation element 110 is coupled to a first connection point CP1 on the connection radiation element 130. Specifically, the additional radiation element 140 has a first end 141 and a second end 142. The first end 141 of the additional radiation element 140 is coupled to a second connection point CP2 on the connection radiation element 130. The second end 142 of the additional radiation element 140 is an open end. That is, the additional radiation element 140 is coupled through the connection radiation element 130 to the feeding radiation element 110. In some embodiments, the connection radiation element 130 is also considered as a terminal widening element of the feeding radiation element 110.

For example, the first grounding radiation element 150 may substantially have a relatively long straight-line shape. Specifically, the first grounding radiation element 150 has a first end 151 and a second end 152. The first end 151 of the first grounding radiation element 150 is coupled to a third connection point CP3 on the ground element 110. The second end 152 of the first grounding radiation element 150 is an open end. The second end 152 of the first grounding radiation element 150 may substantially extend toward the connection radiation element 130. In some embodiments, the first grounding radiation element 150 is adjacent to the feeding radiation element 110, and a first coupling gap GC1 is formed between the first grounding radiation element 150 and the feeding radiation element 110. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

For example, the second grounding radiation element 160 may substantially have a relatively short straight-line shape (compared with the first grounding radiation element 150). Specifically, the second grounding radiation element 160 has a first end 161 and a second end 162. The first end 161 of the second grounding radiation element 160 is coupled to a fourth connection point CP4 on the ground element 120. The second end 162 of the second grounding radiation element 160 is an open end. The second end 162 of the second grounding radiation element 160 and the second end 142 of the additional radiation element 140 may substantially extend toward each other. In some embodiments, the second grounding radiation element 160 is adjacent to the feeding radiation element 110, and a second coupling gap GC2 is formed between the second grounding radiation element 160 and the feeding radiation element 110. Also, a third coupling gap GC3 may be formed between the second grounding radiation element 160 and the additional radiation element 140. For example, in the ground element 120, its negative feeding point FN may be substantially positioned between the third connection point CP3 and the fourth connection point CP4.

The shape and style of the carrier element 170 are not limited in the invention. For example, the feeding radiation element 110, the ground element 120, the connection radiation element 130, the additional radiation element 140, the first grounding radiation element 150, and the second grounding radiation element 160 may all be disposed on the same surface of the carrier element 170. In some embodiments, the carrier element 170 is an FPC (Flexible Printed Circuit). In alternative embodiments, the carrier element 170 is an FR4 (Flame Retardant 4) substrate or a PCB (Printed Circuit Board).

In a preferred embodiment, an antenna structure of the wearable device 100 is formed by the feeding radiation element 110, the ground element 120, the connection radiation element 130, the additional radiation element 140, the first grounding radiation element 150, and the second grounding radiation element 160. Therefore, the wearable device 100 provides the function of wireless communication.

Figure 2:
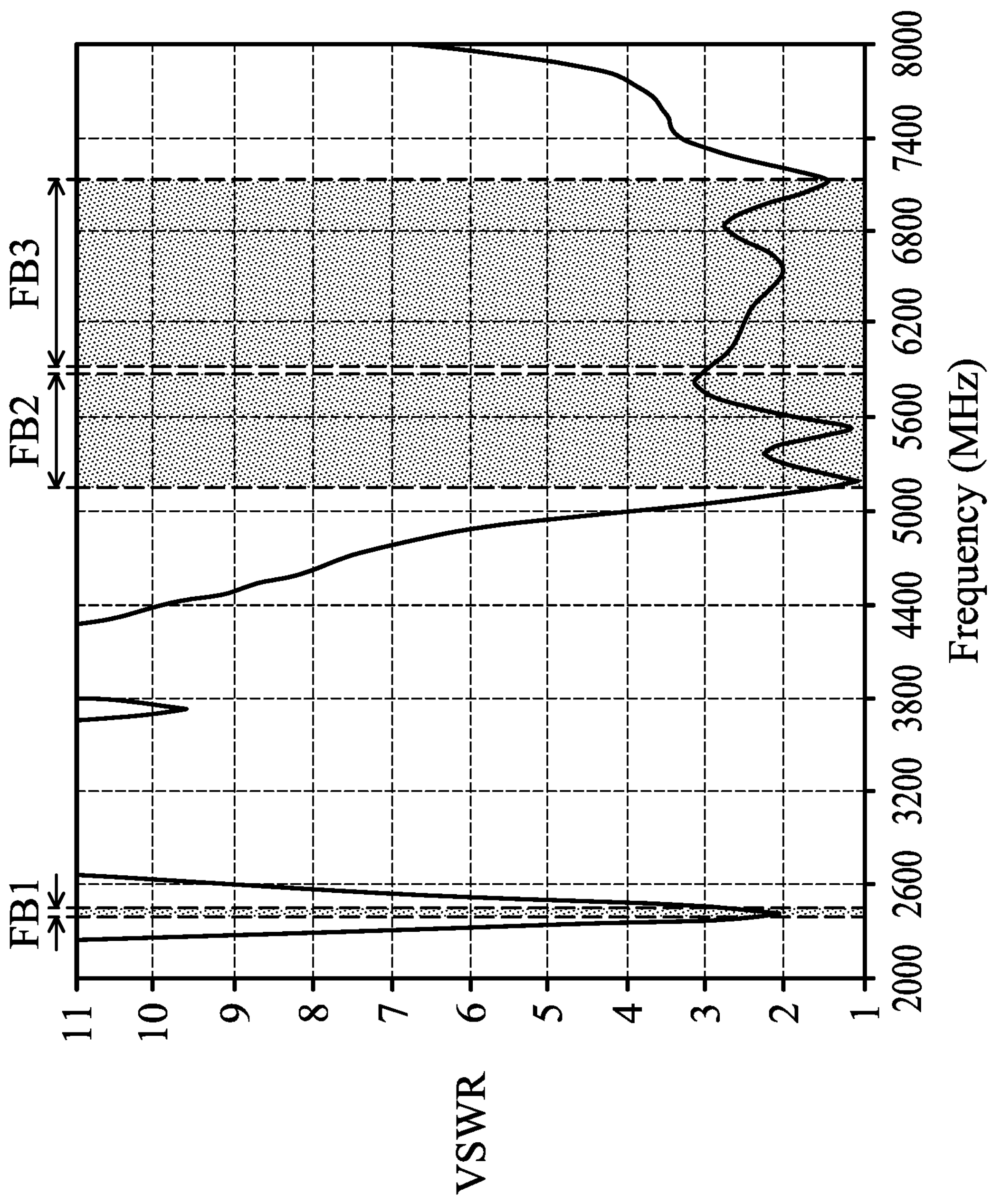
FIG. 2 is a diagram of VSWR (Voltage Standing Wave Ratio) of an antenna structure of a wearable device according to an embodiment of the invention.

FIG. 2 is a diagram of VSWR (Voltage Standing Wave Ratio) of the antenna structure of the wearable device 100 according to an embodiment of the invention. The horizontal axis represents the operational frequency (MHz), and the vertical axis represents the VSWR. According to the measurement of FIG. 2, the antenna structure of the wearable device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the antenna structure of the wearable device 100 can support the wideband operations of both conventional WLAN (Wireless Local Area Networks) and next-generation Wi-Fi 6E.

In some embodiments, the operational principles of the antenna structure of the wearable device 100 will be described as follows. The feeding radiation element 110, the connection radiation element 130, and the additional radiation element 140 can be excited to generate the first frequency band FB1. The first grounding radiation element 150 can be excited by the feeding radiation element 110 using a coupling mechanism, so as to generate the second frequency band FB2. The second grounding radiation element 160 can be excited by the feeding radiation element 110 using another coupling mechanism, so as to generate the third frequency band FB3. According to practical measurements, the widening design of the connection radiation element 130 can be configured to fine-tune the impedance matching of the first frequency band FB1, and the first coupling gap GC1 and the second coupling gap GC2 can be configured to fine-tune the impedance matching of the second frequency band FB2 and the third frequency band FB3. Also, the notch region 125 of the ground element 120 can be configured to accommodate a variety of electronic components, thereby reducing the assembly complexity of the wearable device 100.

In some embodiments, the element sizes of the wearable device 100 will be described as follows. The total length L1 of the feeding radiation element 110, the connection radiation element 130, and the additional radiation element 140 may be substantially equal to 0.25 wavelength ($\lambda/4$) of the first frequency band FB1 of the antenna structure of the wearable device 100. The length L2 of the first grounding radiation element 150 may be substantially equal to 0.25 wavelength ($\lambda/4$) of the second frequency band FB2 of the antenna structure of the wearable device 100. The length L3 of the second grounding radiation element 160 may be substantially equal to 0.25 wavelength ($\lambda/4$) of the third frequency band FB3 of the antenna structure of the wearable device 100. The width W2 of the connection radiation element 130 may be at least three times the width W1 of the feeding radiation element 110. In addition, the width W1 of the feeding radiation element 110 may be greater than the width W3 of each of the first grounding radiation element 150 and the second grounding radiation element 160. The length L4 of the ground element 120 may be from 18 mm to 20 mm. The width W4 of the ground element 120 may be from 10 mm to 13 mm. The length L5 of the notch region 125 may be from 5 mm to 7 mm. The width W5 of the notch region 125 may be from 4 mm to 6 mm. The length L6 of the additional radiation element 140 may be from 3 mm to 4 mm. The width of the first coupling gap GC1 may be from 0.5 mm to 0.6 mm. The width of the second coupling gap GC2 may be from 0.5 mm to 0.6 mm. The width of the third coupling gap GC3 may be from 0.7 mm to 0.9 mm. The above ranges of element sizes are calculated and obtained according to many experiment results, and they help to optimize the operational bandwidth and the impedance matching of the antenna structure of the wearable device 100, and also to reduce the overall difficulty of manufacturing the wearable device 100.

Figure 3:
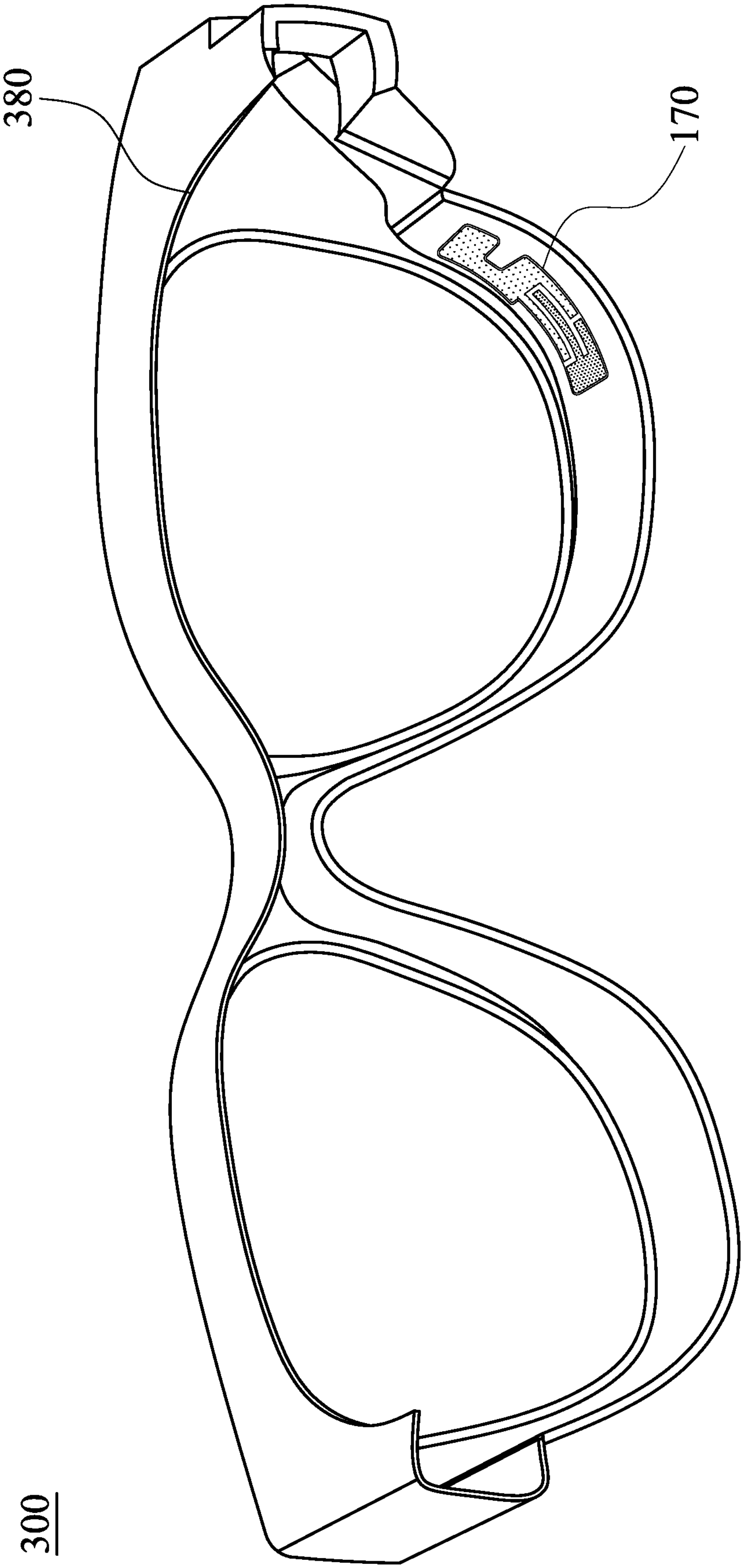
FIG. 3 is a perspective view of a wearable device according to an embodiment of the invention.

FIG. 3 is a perspective view of a wearable device 300 according to an embodiment of the invention. In the embodiment of FIG. 3, the wearable device 300 is a pair of smart eyeglasses with the function of wireless communication, and includes a nonconductive frame element 380. The carrier element 170 or the antenna structure as mentioned above is disposed on the nonconductive frame element 380. For example, the carrier element 170 or the antenna structure as mentioned above may be designed below a display device or a lens of the wearable device 300, but it is not limited thereto. Other features of the wearable device 300 of FIG. 3 are similar to those of the wearable device 100 of FIG. 1. Accordingly, the two embodiments can achieve similar levels of performance.

The invention proposes a novel wearable device. In comparison to the conventional design, the invention has at least the advantages of covering the wideband operations, integrating the antenna structure, minimizing the total antenna size, and reducing the overall manufacturing cost. Therefore, the invention is suitable for application in a variety of small-size devices with communication functions.

Note that the above element sizes, element shapes, and frequency ranges are not limitations of the invention. An antenna designer can fine-tune these settings or values according to different requirements. It should be understood that the wearable device of the invention is not limited to the configurations of FIGS. 1-3. The invention may merely include any one or more features of any one or more embodiments of FIGS. 1-3. In other words, not all of the features displayed in the figures should be implemented in the wearable device of the invention.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wearable device, comprising:

a feeding radiation element, having a positive feeding point;

a ground element, having a negative feeding point;

a connection radiation element;

an additional radiation element, wherein the additional radiation element is coupled through the connection radiation element to the feeding radiation element;

a first grounding radiation element, coupled to the ground element, wherein the first grounding radiation element is adjacent to the feeding radiation element;

a second grounding radiation element, coupled to the ground element, wherein the second grounding radiation element is adjacent to the feeding radiation element; and a carrier element, wherein the feeding radiation element, the ground element, the connection radiation element, the additional radiation element, the first grounding radiation element, and the second grounding radiation element are disposed on the carrier element;

wherein an antenna structure is formed by the feeding radiation element, the ground element, the connection radiation element, the additional radiation element, the first grounding radiation element, and the second grounding radiation element.

2. The wearable device as claimed in claim 1, wherein the wearable device is a pair of smart eyeglasses with a function of wireless communication and comprises a nonconductive frame element, and the carrier element is disposed on the nonconductive frame element.

3. The wearable device as claimed in claim 1, wherein the feeding radiation element is disposed between the first grounding radiation element and the second grounding radiation element.

4. The wearable device as claimed in claim 1, wherein the ground element further has a notch region.

5. The wearable device as claimed in claim 1, wherein the antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

6. The wearable device as claimed in claim 5, wherein a total length of the feeding radiation element, the connection radiation element, and the additional radiation element is substantially equal to 0.25 wavelength of the first frequency band.

7. The wearable device as claimed in claim 5, wherein a length of the first grounding radiation element is substantially equal to 0.25 wavelength of the second frequency band.

8. The wearable device as claimed in claim 5, wherein a length of the second grounding radiation element is substantially equal to 0.25 wavelength of the third frequency band.

9. The wearable device as claimed in claim 1, wherein a first coupling gap is formed between the first grounding radiation element and the feeding radiation element, a second coupling gap is formed between the second grounding radiation element and the feeding radiation element, and a third coupling gap is formed between the second grounding radiation element and the additional radiation element.

10. The wearable device as claimed in claim 1, wherein the carrier element is an FPC (Flexible Printed Circuit).

* * * * *